(12) United States Patent
Takami

(10) Patent No.: US 11,064,103 B2
(45) Date of Patent: Jul. 13, 2021

(54) VIDEO IMAGE TRANSMISSION APPARATUS, INFORMATION PROCESSING APPARATUS, SYSTEM, INFORMATION PROCESSING METHOD, AND RECORDING MEDIUM

(71) Applicant: CANON KABUSHIKI KAISHA, Tokyo (JP)

(72) Inventor: Shinjiro Takami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/258,280

(22) Filed: Jan. 25, 2019

(65) Prior Publication Data

US 2019/0238744 A1 Aug. 1, 2019

(30) Foreign Application Priority Data

Jan. 26, 2018 (JP) .............................. JP2018-011646

(51) Int. Cl.
| | | |
|---|---|---|
| *H04N 5/232* | (2006.01) | |
| *H04N 7/18* | (2006.01) | |
| *G08B 13/196* | (2006.01) | |
| *H04N 5/262* | (2006.01) | |
| *H04N 5/445* | (2011.01) | |
| *H04L 29/08* | (2006.01) | |

(52) U.S. Cl.
CPC ... *H04N 5/23206* (2013.01); *G08B 13/19671* (2013.01); *H04N 5/23216* (2013.01); *H04N 5/2621* (2013.01); *H04N 5/445* (2013.01); *H04N 7/18* (2013.01); *G08B 13/19663* (2013.01); *H04L 29/08711* (2013.01)

(58) Field of Classification Search
CPC ............... H04N 5/232; H04N 5/23206; H04N 5/223216
USPC .............................. 348/211.99, 211.3, 211.13
See application file for complete search history.

(56) References Cited

U.S. PATENT DOCUMENTS

| | | | |
|---|---|---|---|
| 2006/0082664 A1 | 4/2006 | Yoshida | |
| 2008/0024610 A1* | 1/2008 | Konishi | ........... G08B 13/19652 348/159 |
| 2010/0141772 A1* | 6/2010 | Inaguma | ............ H04N 5/23216 348/169 |
| 2010/0194882 A1* | 8/2010 | Belsarkar | ......... G08B 13/19602 348/143 |

(Continued)

FOREIGN PATENT DOCUMENTS

| | | |
|---|---|---|
| CN | 104935826 A | 9/2015 |
| JP | 5999395 B1 | 9/2016 |
| KR | 20180054068 A * | 5/2018 |

*Primary Examiner* — Anthony J Daniels
(74) *Attorney, Agent, or Firm* — Canon U.S.A., Inc. IP Division

(57) ABSTRACT

A video image transmission apparatus configured to transmit a video image captured by an image capturing unit includes a determination unit configured to determine whether to add object information to metadata based on a video type of an image to be transmitted to an information processing apparatus, an addition unit configured to add, to the metadata, the object information about the video image to be transmitted to the information processing apparatus in a case where the determination unit determines that the object information is to be added to the metadata, and a transmission unit configured to transmit the video image and the metadata to the information processing apparatus.

12 Claims, 11 Drawing Sheets

(56) References Cited

U.S. PATENT DOCUMENTS

| | | |
|---|---|---|
| 2010/0231687 A1* | 9/2010 | Amory .................. H04N 5/232 348/36 |
| 2011/0050901 A1 | 3/2011 | Oya |
| 2012/0062732 A1 | 3/2012 | Marman |
| 2015/0077578 A1 | 3/2015 | Iwasaki |
| 2015/0109452 A1* | 4/2015 | Fujimatsu ............. H04N 7/181 348/159 |
| 2017/0323540 A1* | 11/2017 | Boykin ............ G08B 13/19613 |
| 2019/0068924 A1* | 2/2019 | Usie ....................... H04N 7/188 |
| 2019/0163964 A1* | 5/2019 | Kawamae .......... G06K 9/00228 |

* cited by examiner (Prior Art)

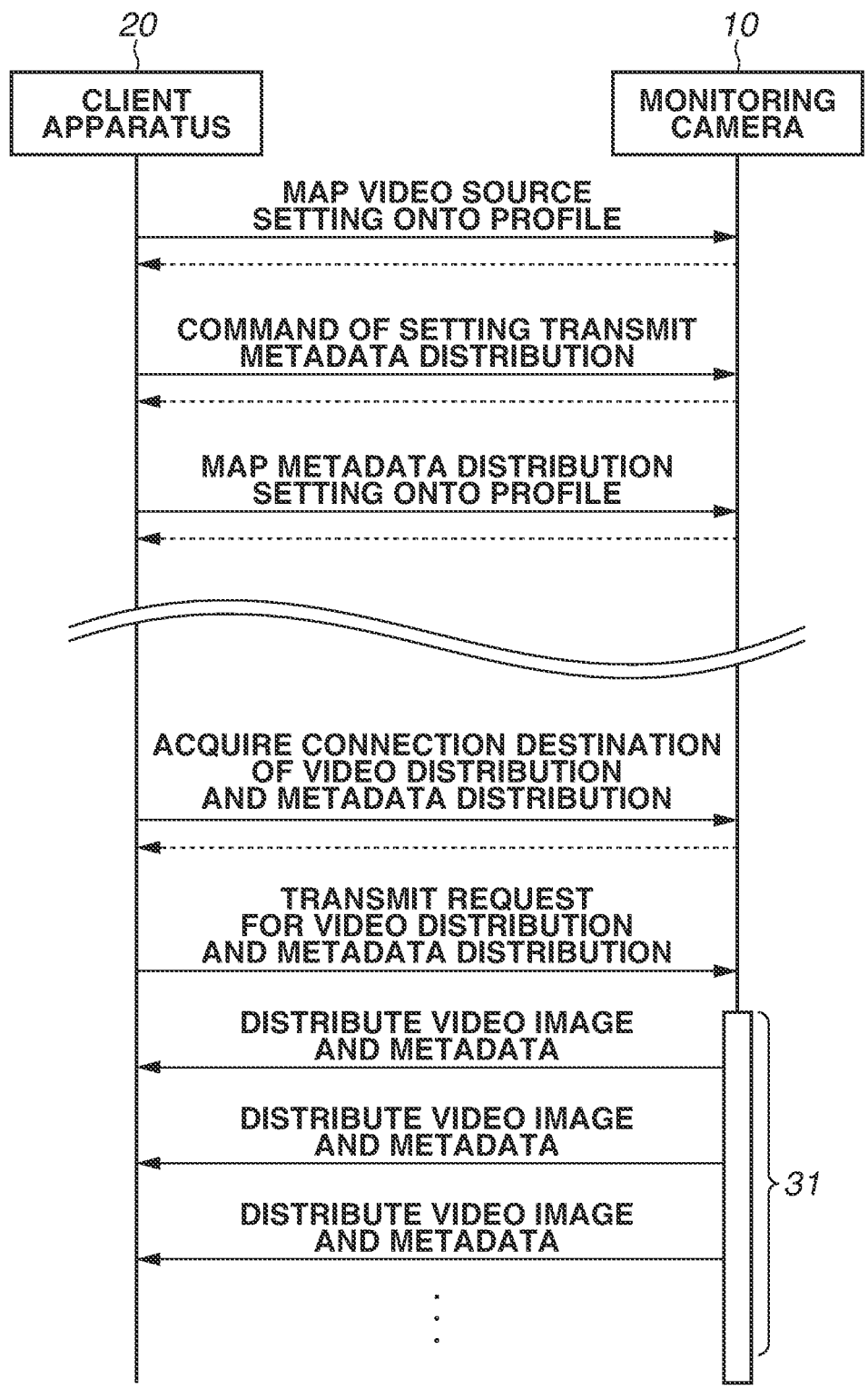

FIG.6

PROFILE SETTING SCREEN — 40

| PROFILE | VIDEO SOURCE SETTING | METADATA DISTRIBUTION SETTING |
|---|---|---|
| profile1 | VIDEO SOURCE 1 (FISH-EYE) ▼ | ☑ INCLUDE OBJECT INFORMATION |
| profile2 | VIDEO SOURCE 2 (PANORAMA) ▼ | ○ INCLUDE OBJECT INFORMATION |
| profile3 | VIDEO SOURCE 3 (CUT 1) ▼ | ○ INCLUDE OBJECT INFORMATION |

41 · 42 · 43

44 — SET

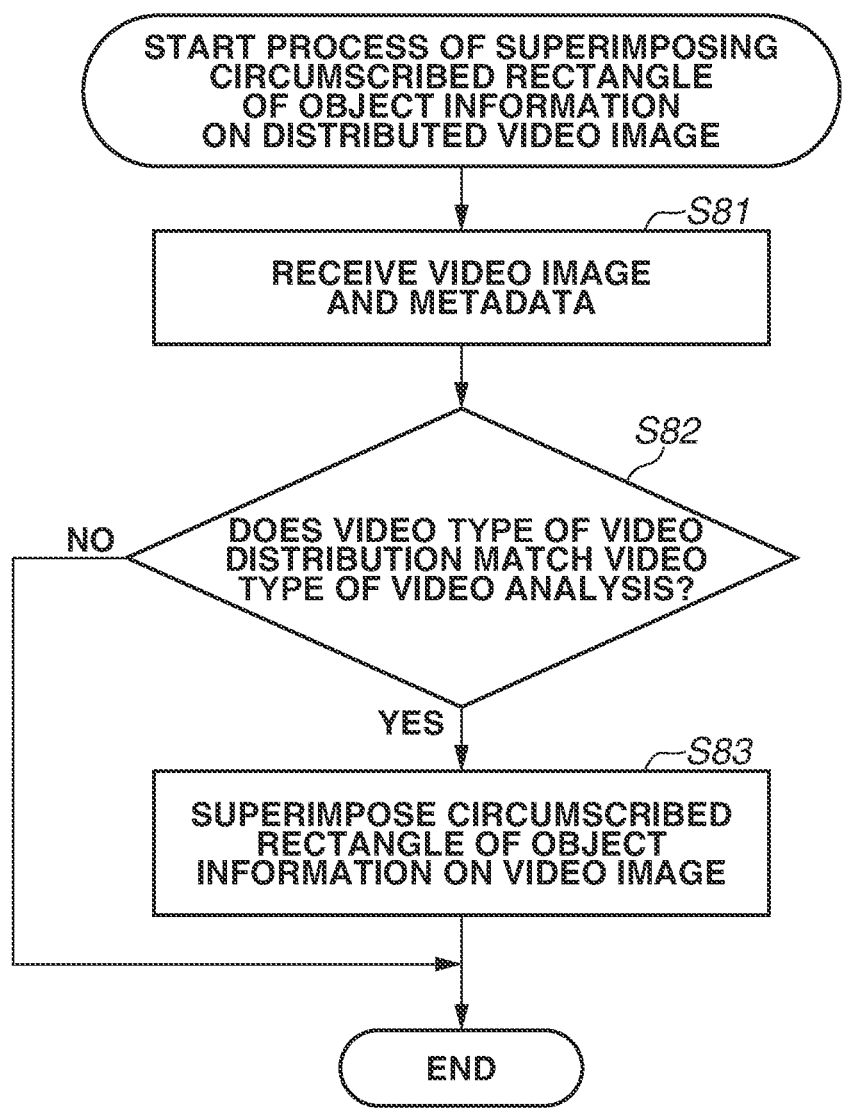

VIDEO IMAGE TRANSMISSION APPARATUS, INFORMATION PROCESSING APPARATUS, SYSTEM, INFORMATION PROCESSING METHOD, AND RECORDING MEDIUM

BACKGROUND OF THE INVENTION

Field of the Invention

The present invention relates to a video image transmission apparatus, an information processing apparatus, a system, an information processing method, and a recording medium.

Description of the Related Art

A conventional camera generates a plurality of types of video images by correcting a distortion of a captured image and/or cutting the captured image and distributes the generated video images to a client apparatus, or analyzes the generated video images and distributes object information detected as a result of the video analysis as metadata.

Further, commands such as changing a monitoring camera setting from an external apparatus side and a command for giving an instruction to start image distribution are implemented on a monitoring camera that distributes captured video images to a client apparatus. Known examples of such commands are those defined in the standards set by the Open Network Video Interface Forum (ONVIF).

ONVIF defines a video source setting (video source configuration) including the video type of an image to be distributed, as a monitoring camera setting (configuration). ONVIF further defines a metadata distribution setting (metadata configuration) for setting whether to "include or not include" object information detected as a result of video analysis in a metadata distribution, etc. as a monitoring camera configuration.

The configuration is mapped onto (associated with) a profile setting (profile) designated at the time of distribution by a camera, and the camera distributes a video image and metadata according to the content of the configuration mapped on the profile setting.

FIG. 1 illustrates an example of mapping the configuration onto a profile setting according to ONVIF. As illustrated in FIG. 1, one video source setting and one metadata distribution setting are respectively selected from one or more video source settings and one or more metadata distribution settings, and the video source setting and the metadata distribution setting that are selected are mapped onto the profile setting.

However, in the case in which a camera configured to generate a plurality of types of video images and perform video analysis using the plurality of types of video images performs video distribution and metadata distribution based on the ONVIF profile settings, the metadata distribution setting does not contain information indicating the video type for which the video analysis is to be performed. Thus, there arises a case in which a video analysis result that is different from a video image to be distributed is distributed as metadata and confuses a user.

For example, there is an omnidirectional camera configured to generate a fish-eye video image, which is captured through a fish-eye lens, and a panoramic video image, which is generated by correcting a distortion of the fish-eye video image and/or cutting the fish-eye video image.

In the case in which the video type of the video source setting of the omnidirectional camera is set to the fish-eye video image whereas the video analysis is performed using the panoramic video image, the fish-eye video image is distributed whereas the object information generated from the panoramic video image is included in the distributed metadata. Consequently, the object information detected from the panoramic video image might be superimposed on the fish-eye video image.

Further, an image capturing apparatus that determines whether to "distribute or not distribute" metadata based on the video type of an image to be distributed is discussed in Japanese Patent No. 5999395.

However, in the technique discussed in Japanese Patent No. 5999395, it is determined whether to "distribute or not distribute metadata" in the case where the video type of the image to be distributed is a specific video type, and if the video type of the image to be distributed is the specific video type, metadata is not distributed even in the case in which the video image to be distributed matches the video image of video analysis.

SUMMARY OF THE INVENTION

According to an aspect of the present invention, a video image transmission apparatus configured to transmit a video image captured by an image capturing unit includes a determination unit configured to determine whether to add object information to metadata based on a video type of an image to be transmitted to an information processing apparatus, an addition unit configured to add, to the metadata, the object information about the video image to be transmitted to the information processing apparatus in a case where the determination unit determines that the object information is to be added to the metadata, and a transmission unit configured to transmit the video image and the metadata to the information processing apparatus.

Further features of the present invention will become apparent from the following description of exemplary embodiments with reference to the attached drawings.

BRIEF DESCRIPTION OF THE DRAWINGS

FIG. 5 is a sequence diagram illustrating an example of information processing in a system in a first exemplary embodiment.

FIG. 6 illustrates an example of a profile setting screen.

FIG. 11 is a flowchart illustrating an example of information processing in a client apparatus.

DESCRIPTION OF THE EMBODIMENTS

Various exemplary embodiments of the present invention will be described below with reference to the drawings.

Figure 1:
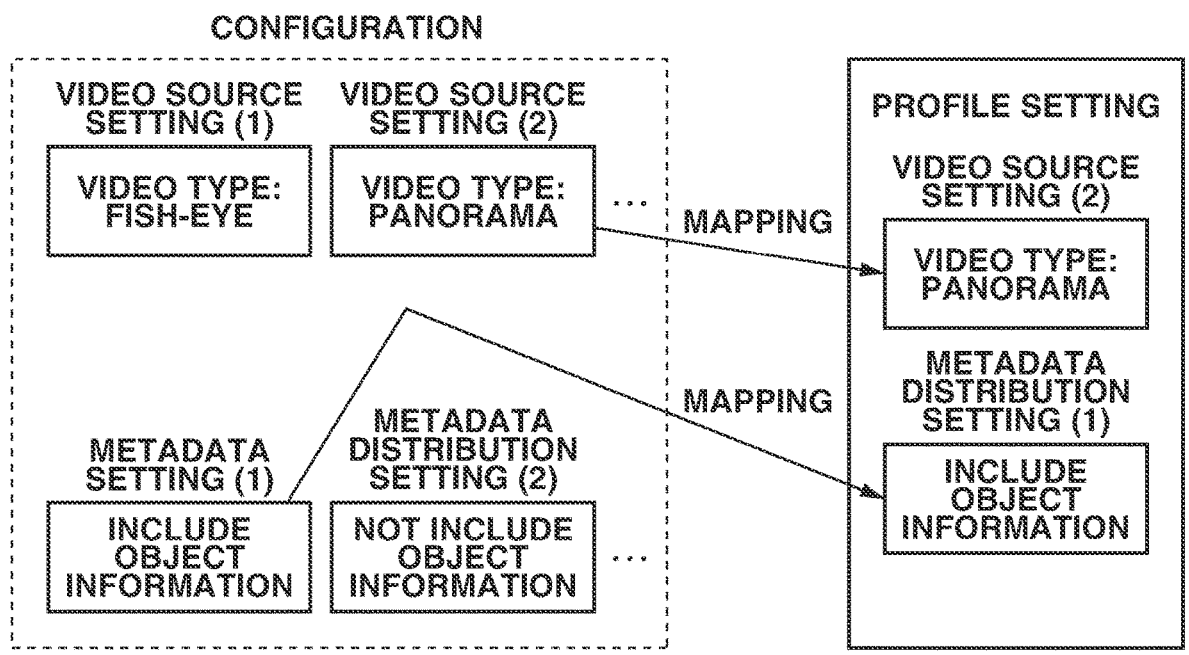
FIG. 1 illustrates an example of mapping a configuration onto a profile setting.
Figure 2:
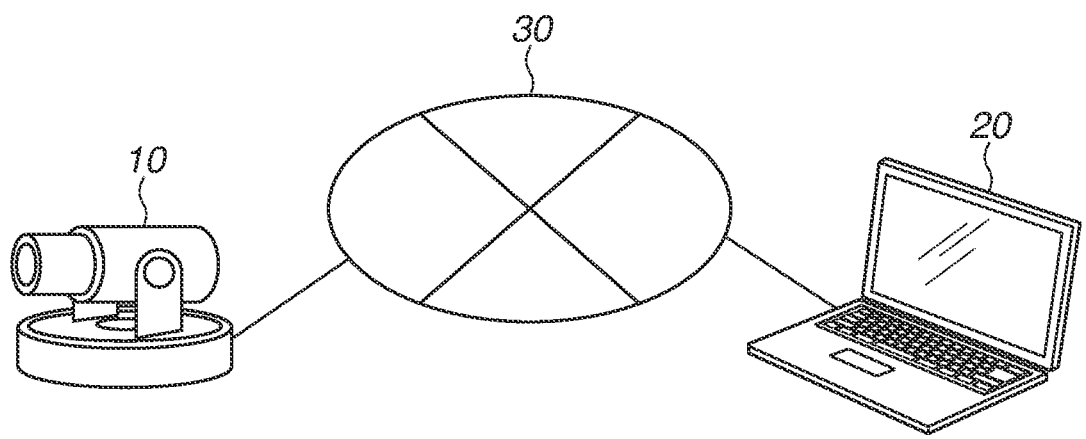
FIG. 2 illustrates an example of a system configuration including a monitoring camera.

The following describes a network configuration according to a first exemplary embodiment of the present invention with reference to FIG. 2.

FIG. 2 illustrates an example of the system configuration including a monitoring camera 10. The monitoring camera 10 and a client apparatus 20 are connected via a network 30 such that the monitoring camera 10 and the client apparatus 20 are communicable with each other. The client apparatus 20 transmits various control commands described below to the monitoring camera 10. The control commands are, for example, a command for mapping a video source setting and a metadata distribution setting onto a profile setting, a metadata distribution setting command, and a command for acquiring the connection destination of video and metadata distribution. Other control commands include a command for requesting video and metadata distribution, and a command for acquiring the video type on which the video analysis is performed. The monitoring camera 10 transmits a response to the commands and transmits a video image and metadata in response to a request for video and metadata distribution to the client apparatus 20. The monitoring camera 10 is an example of a video image transmission apparatus. The client apparatus 20 is an example of an information processing apparatus.

Figure 3A:
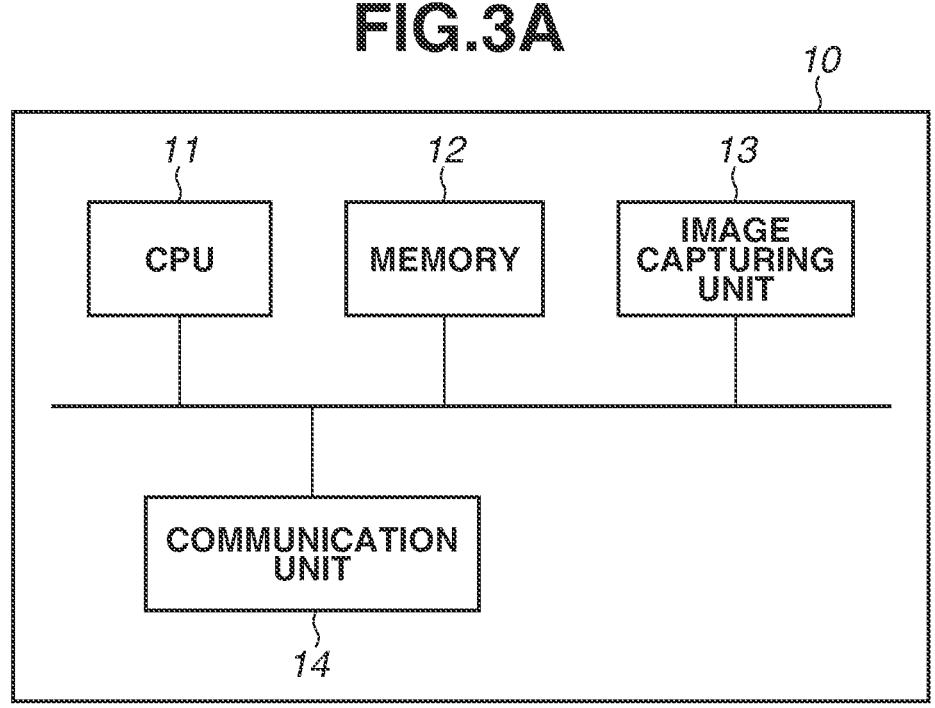
FIGS. 3A and 3B illustrate an example of a hardware configuration.

FIG. 3A illustrates an example of the hardware configuration of the monitoring camera 10.

A central processing unit (CPU) 11 controls the entire monitoring camera 10. A memory 12 is used as various data storage areas, such as a storage area for a program to be executed by the CPU 11, a work area while a program is executed, a storage area for setting values, and a storage area for image data generated by an image capturing unit 13 described below. The setting values are the values (configurations) with respect to the monitoring camera 10, profile setting, also an installation state of cameras such as a ceiling camera or wall camera, and the video type on which the video analysis is performed.

The configurations include a video source setting (video source configuration) and a metadata distribution setting (metadata configuration). The video source setting includes the video type of an image to be distributed. The metadata distribution setting is made to determine whether to include or not include object information detected through the video analysis for the image captured by the image capturing unit 13, in the metadata distribution. For example, the video analysis is performed by an image analysis processing unit of the monitoring camera 10.

For example, the CPU 11 executes processing based on a program stored in the memory 12 to realize the image analysis processing unit. Also, the object information includes information which indicates position of the object in the image and information which indicates the kind of the object. For example, the kind is a human, a vehicle, a moving object.

Further, the configurations are mapped onto the profile setting (profile) designating the control of the monitoring camera 10, and the monitoring camera 10 performs video distribution and metadata distribution based on the content of the configurations mapped on the profile setting.

The image capturing unit 13 captures a subject image formed by an image capturing optical system of the monitoring camera 10 and acquires an analog signal, converts the analog signal into digital data, and outputs the digital data as a captured image to a storage unit 1002. When the captured image is output to the storage unit 1002, the CPU 11 receives an image acquisition event from the image capturing unit 13. The image capturing unit 13 is an example of an image capturing unit.

A communication unit 14 is used in receiving a control command from an external device and transmitting a response to the control command, a video image, or metadata to the external device. In the case of receiving the command from the external device, the CPU 11 receives a command reception event from the communication unit 14.

The CPU 11 executes processing based on a program stored in the memory 12 to realize the functional configuration illustrated in FIG. 4A described below and the processing of the monitoring camera 10 in the sequence diagram illustrated in FIG. 5 or 10 or the information processing in the flowchart illustrated in FIG. 8 or 9.

The hardware configuration of the monitoring camera 10 in FIG. 3A is a mere example, and the monitoring camera 10 can include an audio input unit, an audio output unit, and/or an image analysis processing unit as hardware besides that illustrated in FIG. 3A.

Figure 3B:
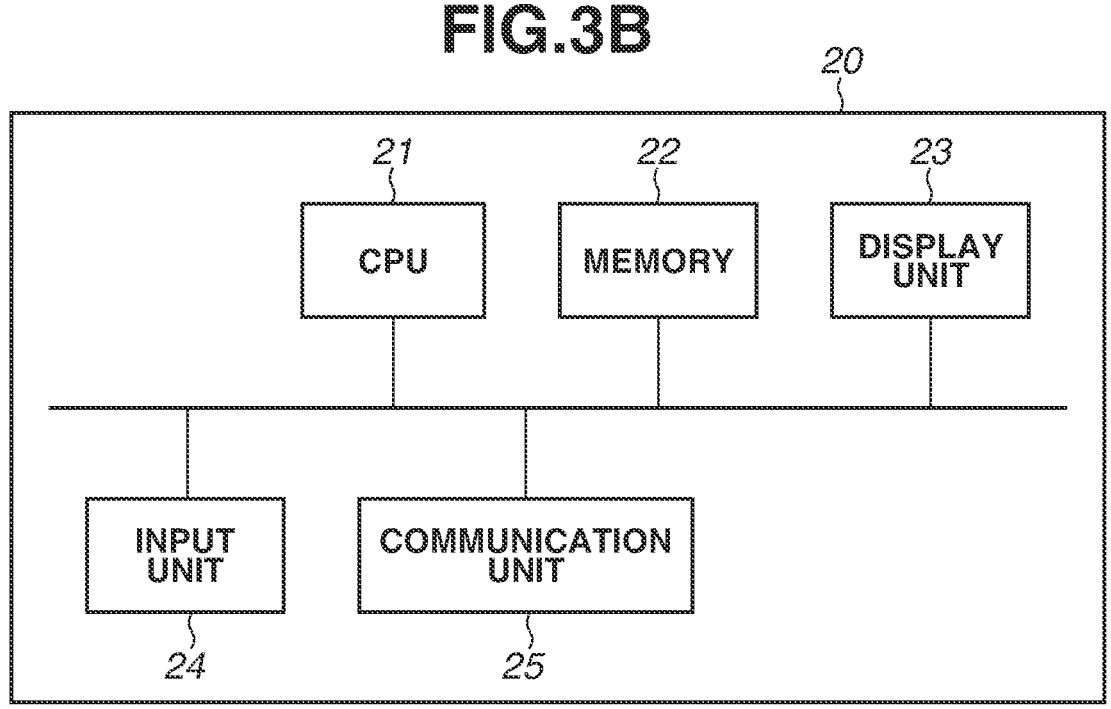

FIG. 3B illustrates an example of the hardware configuration of the client apparatus 20.

A CPU 21 controls the entire client apparatus 20.

A memory 22 is used as various data storage areas, such as a storage area for a program that is to be executed mainly by the CPU 21 and a work area while a program is executed.

A display unit 23 is, for example, a liquid crystal display (LCD) or organic electroluminescent display (organic EL display). The display unit 23 displays various setting screens including a profile setting screen, a viewer screen for video images received from the monitoring camera 10, various messages, etc. to the user of the client apparatus 20.

An input unit 24 includes, for example, a button, a cross key, a touch panel, and a mouse and notifies the CPU 21 of details of screen operations performed by the user.

A communication unit 25 is used in transmitting various control commands described below to the monitoring camera 10 and receiving a response to the control commands, a video image, or metadata from the monitoring camera 10. The control commands are, for example, a command for mapping a video source setting and a metadata distribution setting onto a profile setting, a metadata distribution setting command, a command for acquiring the connection destination of video and metadata distribution, a command for requesting video and metadata distribution, and a command for acquiring the video type on which the video analysis is performed.

The CPU 21 executes processing based on a program stored in the memory 22 to realize the functional configuration illustrated in FIG. 4B described below and the processing of the client apparatus 20 in the sequence diagram illustrated in FIG. 5 or 10 or the information processing in the flowchart illustrated in FIG. 11.

Figure 4A:
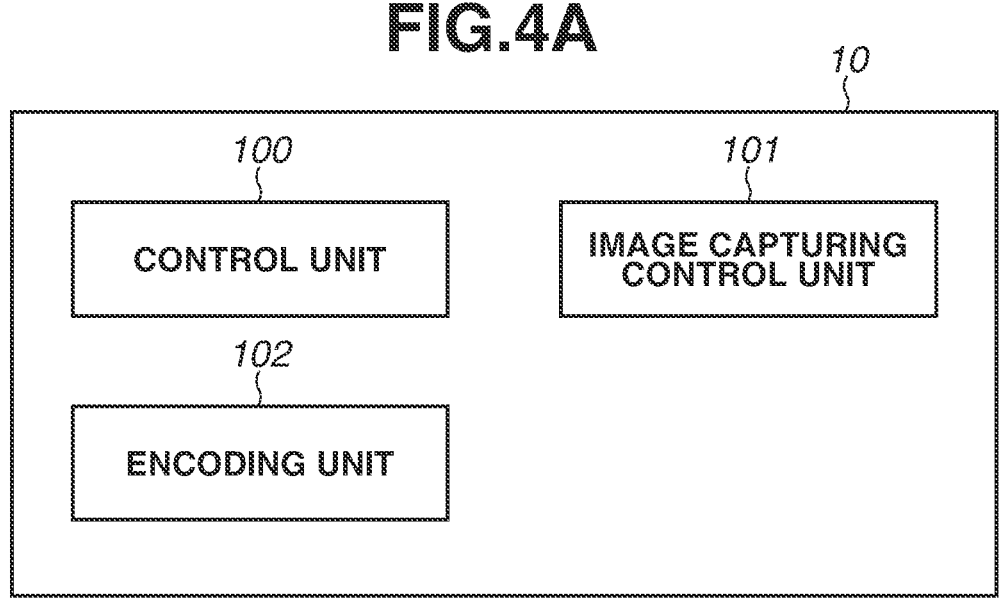
FIGS. 4A and 4B illustrate an example of a functional configuration.

FIG. 4A illustrates an example of the functional configuration of the monitoring camera 10.

A control unit 100 controls the entire processing of the monitoring camera 10.

An image capturing control unit 101 controls the image capturing unit 13. For example, the image capturing control unit 101 changes the image capturing range of the image capturing unit 13 to the tilt driving, pan driving, or zoom driving according to the pan, tilt, or zoom value input by the control unit 100.

An encoding unit 102 generates image data by encoding the captured image output from the image capturing unit 13 based on a Joint Photographic Experts Group (JPEG), H.264, H.265, etc. format and outputs the generated image data to the memory 12.

The image capturing control unit 101 can be implemented as a hardware configuration to the monitoring camera 10. Similarly, the encoding unit 102 can be implemented as a hardware configuration to the monitoring camera 10.

Figure 4B:
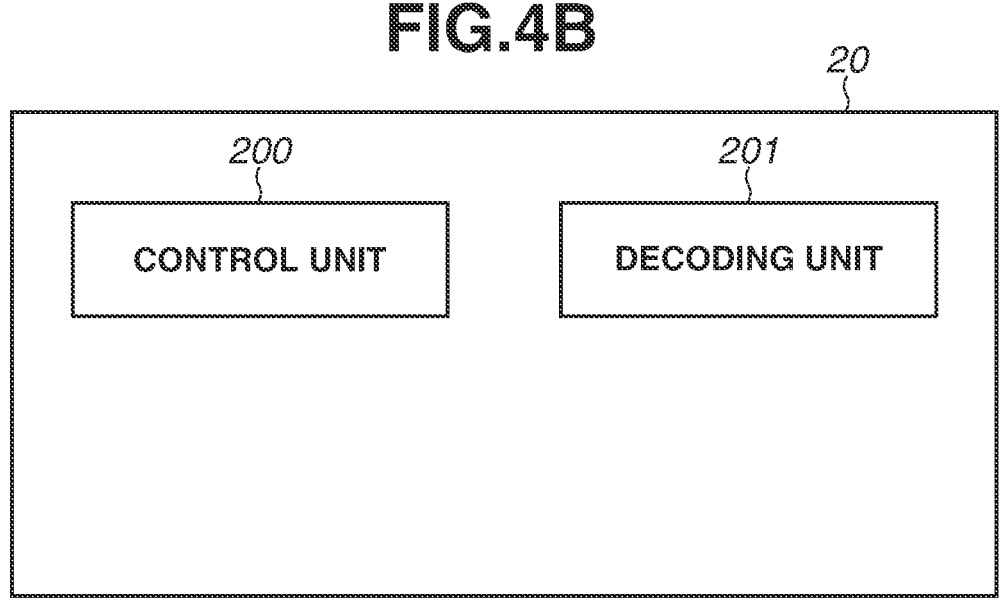

FIG. 4B illustrates an example of the software configuration of the client apparatus 20.

A control unit 200 controls the entire processing of the client apparatus 20.

A decoding unit 201 decodes the encoded image data received via the communication unit 25 based on a JPEG, H.264, H.265, etc. format and develops the decoded image data onto the memory 22.

The decoding unit 201 can be implemented as a hardware configuration on the client apparatus 20.

The following describes a sequence in which the monitoring camera 10 distributes a video image and metadata to the client apparatus 20, with reference to FIG. 5.

The control unit 200 of the client apparatus 20 transmits, to the monitoring camera 10, a command for mapping (associating) a video source setting corresponding to the video type of an image to be distributed, onto a profile setting in order to set the video type.

The control unit 100 of the monitoring camera 10 receives the command, maps the video source setting designated in the command onto the profile setting, and transmits a response indicating the completion of the profile setting as a response to the command to the client apparatus 20. The control unit 200 of the client apparatus 20 receives the response from the monitoring camera 10. The video image defined by the video source setting mapped onto the profile setting is transmitted to the client apparatus 20.

The control unit 200 of the client apparatus 20 transmits a metadata distribution setting command to the monitoring camera 10 in order to set whether to "include or not include" the object information in the metadata.

The control unit 100 of the monitoring camera 10 receives the command, updates the metadata setting with the designated setting, and transmits a response indicating the completion of the metadata distribution setting as a response to the command to the client apparatus 20. The control unit 200 of the client apparatus 20 receives the response from the monitoring camera 10.

The control unit 200 of the client apparatus 20 transmits a command for mapping the designated metadata distribution setting onto the designated profile setting in order to distribute the metadata based on the metadata distribution setting.

The control unit 100 of the monitoring camera 10 receives the command, maps the designated metadata distribution setting onto the designated profile setting, and transmits a response indicating the completion of the profile setting as a response to the command to the client apparatus 20. The metadata defined by the metadata distribution setting mapped onto the profile setting is transmitted to the client apparatus 20. The control unit 200 of the client apparatus 20 receives the response from the monitoring camera 10.

The control unit 200 of the client apparatus 20 designates a profile and transmits a command for acquiring the connection destination of the video distribution and metadata distribution, to the monitoring camera 10 in order to acquire the connection destination (uniform resource identifier (URI), etc.) of the video and metadata distributions based on the set profile.

The control unit 100 of the monitoring camera 10 receives the command, generates the connection destination of the video and metadata distribution based on the designated profile, and transmits the connection destination to the client apparatus 20. The control unit 200 of the client apparatus 20 receives the connection destination from the monitoring camera 10.

The control unit 200 of the client apparatus 20 transmits a command for requesting video and metadata distribution to the acquired connection destination.

The control unit 100 of the monitoring camera 10 receives the command, generates the video image to be distributed, generates metadata through processing 31 in which object information is added to the metadata, and transmits the video image and the metadata to the client apparatus 20. The video image and the metadata to be distributed are the video image and the metadata defined on the set profile. The control unit 200 of the client apparatus 20 receives the video image and the metadata.

FIG. 5 is not intended to limit the protocols of the commands, and the protocols of the commands are the ONVIF protocols, unique control protocols of the monitoring camera, etc.

FIG. 6 illustrates an example of the profile setting screen. A profile setting screen 40 illustrated in FIG. 6 is displayed on the display unit 23 of the client apparatus 20. A profile identifier (ID) list display area 41 displays a list of identifiers of the profiles set to the monitoring camera 10. The user operates the input unit 24 of the client apparatus 20 and selects a video source setting that indicates the distribute target video type of an image of the corresponding profile setting, from a selection box 42 of a video source setting video type.

Further, the user operates the input unit 24 of the client apparatus 20 to select whether to "include or not include" object information in the metadata in the metadata distribution using a checkbox 43 for selecting whether to "include or not include" object information in metadata.

If the user selects a set button 44, the control unit 200 of the client apparatus 20 transmits a command for mapping the video source setting and the metadata distribution setting onto the profile setting and a metadata distribution setting command to the monitoring camera 10.

Figure 7:
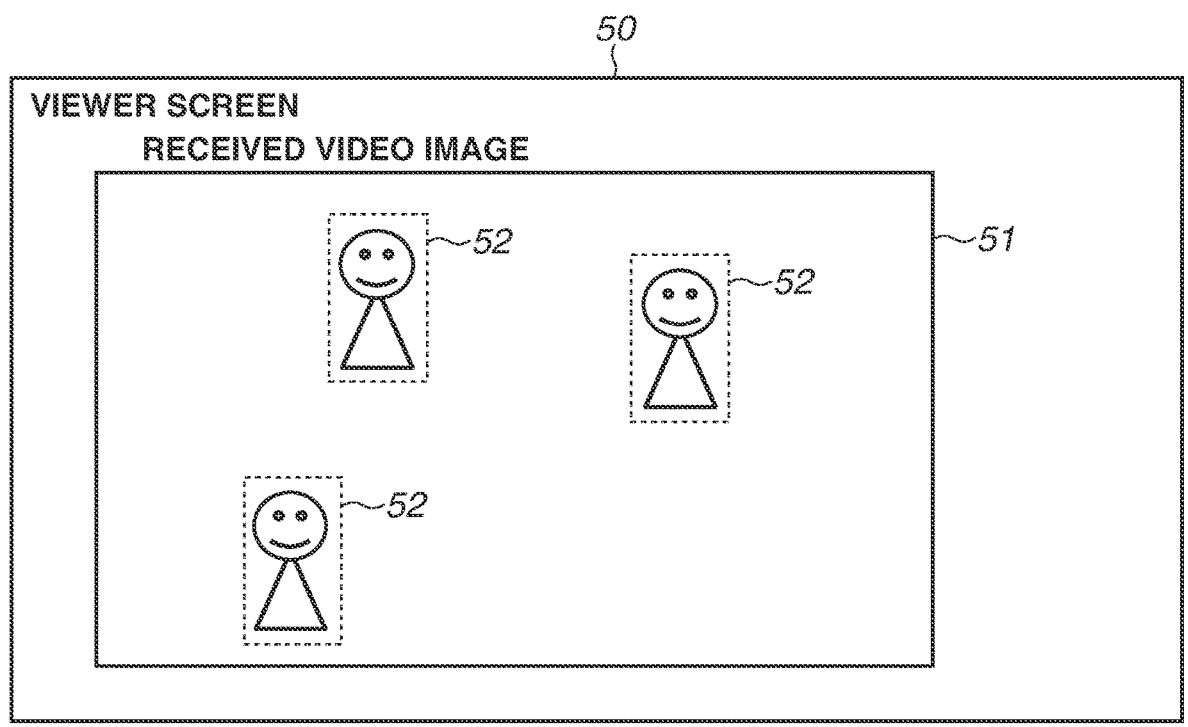
FIG. 7 illustrates an example of a viewer screen.

FIG. 7 illustrates an example of the viewer screen. A viewer screen 50 in FIG. 7 is displayed on the display unit 23 of the client apparatus 20. The control unit 200 of the client apparatus 20 transmits a command for acquiring the connection destination of the video and metadata distribution, to the monitoring camera 10. Further, the control unit 200 of the client apparatus 20 receives the connection destination from the monitoring camera 10.

The control unit 200 of the client apparatus 20 transmits a command for requesting video and metadata distribution, to the connection destination of the monitoring camera 10. Further, the control unit 200 of the client apparatus 20 receives the video image and the metadata from the connection destination of the monitoring camera 10.

The control unit 200 of the client apparatus 20 superimposes a circumscribed rectangle 52 of an object generated from the object information contained in the metadata, on the video image received from the monitoring camera 10 and displays the resulting image in a video image display area 51.

Figure 8:
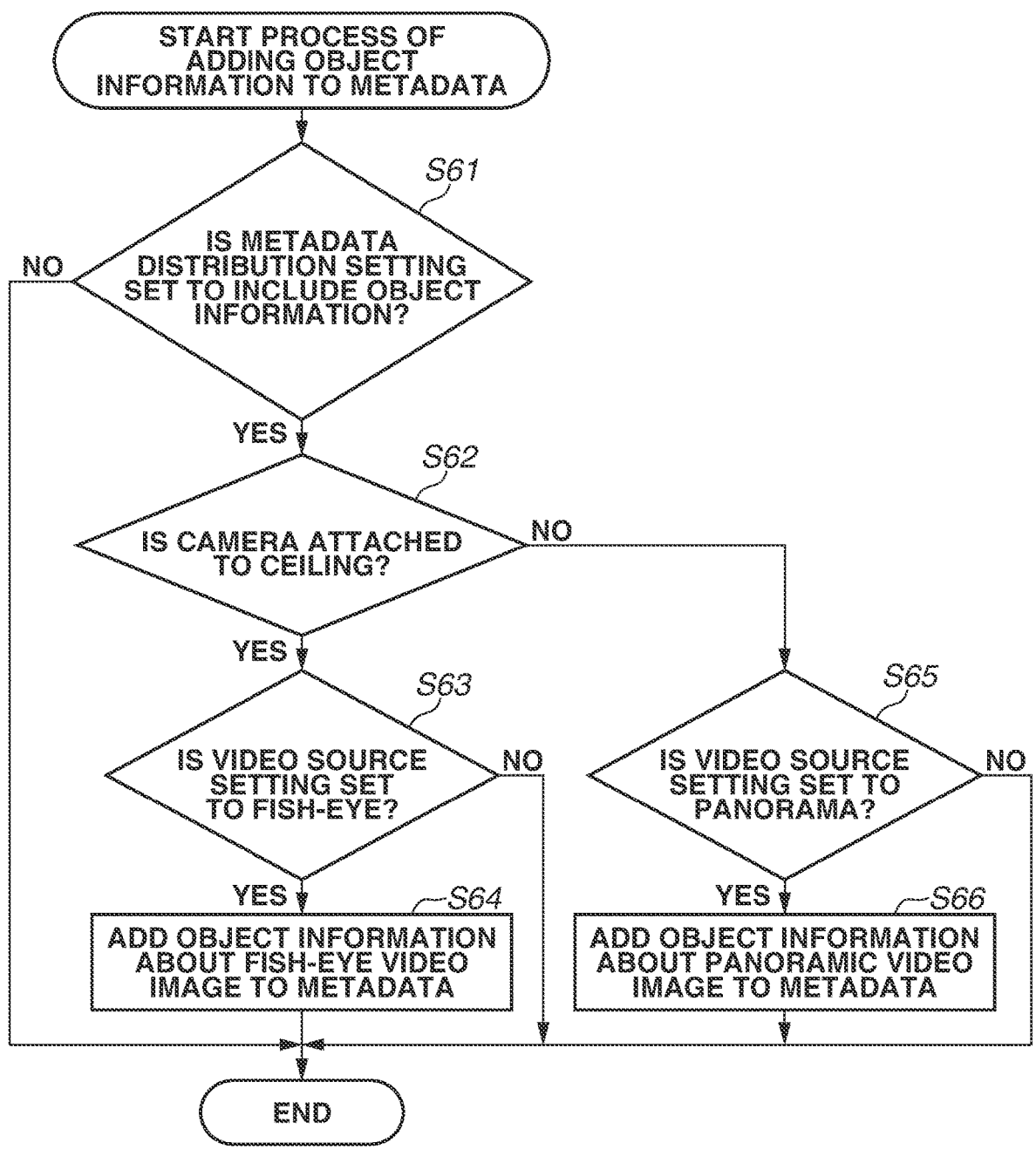
FIG. 8 is a flowchart illustrating an example of information processing in the monitoring camera in the first exemplary embodiment.

The following describes the processing 31 for adding the object information to the metadata of the monitoring camera 10, with reference to FIG. 8.

In step S61, the control unit 100 of the monitoring camera 10 acquires, from the memory 12, information about whether to "include or not include" the object information in the metadata of the metadata distribution setting, and determines whether the object information is to be included in the metadata. If the object information is to be included (YES in step S61), the processing proceeds to step S62. On the other hand, if the object information is not to be included (NO in step S61), the process in the flowchart in FIG. 8 is ended.

In step S62, the control unit 100 of the monitoring camera 10 acquires the camera installation state from the memory 12 and determines whether the monitoring camera 10 is attached to the ceiling. If the control unit 100 of the monitoring camera 10 determines that the monitoring camera 10 is attached to the ceiling (YES in step S62), the processing proceeds to step S63. On the other hand, if the control unit 100 of the monitoring camera 10 determines that the monitoring camera 10 is attached to the wall (NO in step S62), the processing proceeds to step S65.

In step S63, the control unit 100 of the monitoring camera 10 sets the video type for which the video analysis is to be performed to "fish-eye". Then, the control unit 100 acquires the video type of the video source setting from the memory 12 and determines whether the video type of the video source setting is fish-eye. If the control unit 100 determines that the video type of the video source setting is fish-eye (YES in step S63), the processing proceeds to step S64. On the other hand, if the control unit 100 determines that the video type of the video source setting is not fish-eye (NO in step S63), the process in the flowchart in FIG. 8 is ended.

In step S64, the control unit 100 of the monitoring camera 10 adds the object information indicating an object which is detected from the fish-eye video image to the metadata, and the process in the flowchart in FIG. 8 is ended. In this way, the control unit 100 adds the object information to the metadata in the case where the video type for which the video analysis is performed matches the video type of the distribution target image.

In step S65, the control unit 100 of the monitoring camera 10 sets the video type for which the video analysis is to be performed to "panorama". Then, the control unit 100 acquires the video type of the video source setting from the memory 12 and determines whether the video type of the video source setting is panorama. If the control unit 100 determines that the video type of the video source setting is panorama (YES in step S65), the processing proceeds to step S66. On the other hand, if the control unit 100 determines that the video type of the video source setting is not panorama (NO in step S65), the process in the flowchart in FIG. 8 is ended.

In step S66, the control unit 100 of the monitoring camera 10 adds the object information indicating an object which is detected from the panoramic video image to the metadata, and the process in the flowchart in FIG. 8 is ended. In this way, the control unit 100 adds the object information to the metadata in the case where the video type for which the video analysis is performed matches the video type of the distribution target image to be distributed.

The control unit 200 of the client apparatus 20 receives the video image and the metadata from the monitoring camera 10, superimposes the circumscribed rectangle of the object information contained in the received metadata on the received video image, and displays the resulting image.

As described above, in the first exemplary embodiment, the monitoring camera 10 determines, based on the camera installation state, the video image on which the video analysis is performed, and only if the video image to be distributed matches the video image on which the video analysis is performed, the monitoring camera 10 adds the object information to the metadata and transmits the metadata to the client apparatus 20. In this way, the client apparatus 20 is prevented from superimposing a circumscribed rectangle of a wrong object on the video image.

Figure 9:
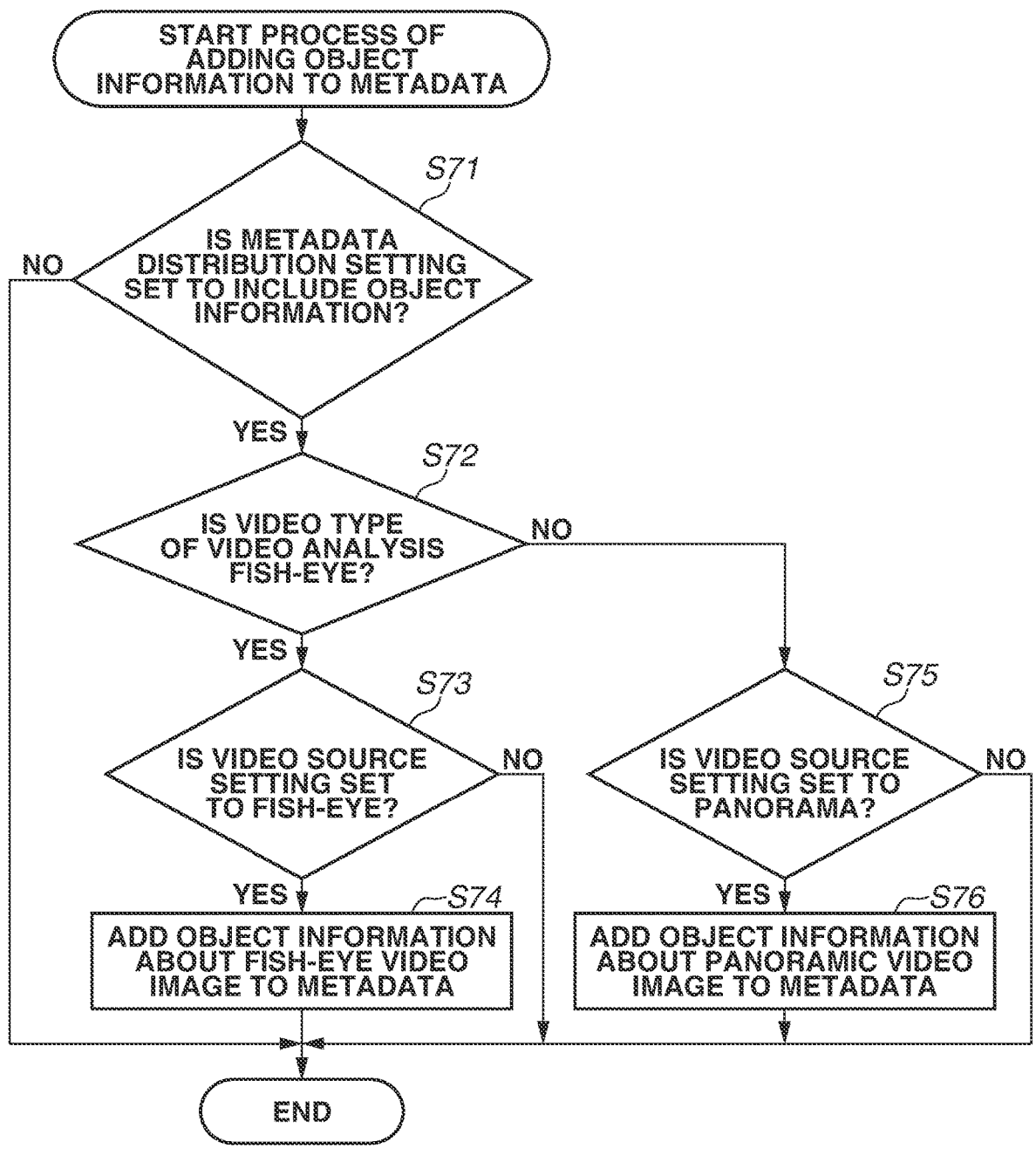
FIG. 9 is a flowchart illustrating an example of information processing in the monitoring camera in a second exemplary embodiment.

The following describes the processing 31 for adding object information to metadata of the monitoring camera 10 in a second exemplary embodiment, with reference to FIG. 9. Description of the points that are similar to those in the first exemplary embodiment (FIGS. 2 to 7) is omitted.

In step S71, the control unit 100 of the monitoring camera 10 acquires, from the memory 12, information about whether to "include or not include" the object information in the metadata of the metadata distribution setting, and determines whether the object information is to be included in the metadata. If the object information is to be included (YES in step S71), the processing proceeds to step S72. On the other hand, if the object information is not to be included (NO in step S71), the process in the flowchart in FIG. 9 is ended.

In step S72, the control unit 100 of the monitoring camera 10 acquires, from the memory 12, the video type for which the video analysis is performed, and determines whether the video type is fish-eye. If the control unit 100 determines that the video type of the video analysis is fish-eye (YES in step S72), the processing proceeds to step S73. On the other hand, if the control unit 100 determines that the video type of the video analysis is panorama (NO in step S72), the processing proceeds to step S75.

In step S73, the control unit 100 of the monitoring camera 10 acquires the video type of the video source setting from the memory 12 and determines whether the video type of the video source setting is fish-eye. If the control unit 100 determines that the video type is fish-eye (YES in step S73), the processing proceeds to step S74. On the other hand, if the control unit 100 determines that the video type is not fish-eye (NO in step S73), the process in the flowchart in FIG. 9 is ended.

In step S74, the control unit 100 of the monitoring camera 10 adds the object information indicating an object which is detected from the fish-eye video image to the metadata, and the process in the flowchart in FIG. 9 is ended.

In step S75, the control unit 100 of the monitoring camera 10 acquires the video type of the video source setting from the memory 12 and determines whether the video type of the video source setting is panorama. If the control unit 100 determines that the video type is panorama (YES in step S75), the processing proceeds to step S76. On the other hand, if the control unit 100 determines that the video type is not panorama (NO in step S75), the process in the flowchart in FIG. 9 is ended.

In step S76, the control unit 100 of the monitoring camera 10 adds the object information indicating an object which is detected from the panoramic image to the metadata, and the process in the flowchart in FIG. 9 is ended.

As described above, in the second exemplary embodiment, the monitoring camera 10 adds the object information to the metadata only if the video image to be distributed matches the video image on which the video analysis is performed, based on the video type for which the video analysis is currently performed. In this way, the client apparatus 20 is prevented from superimposing a circumscribing rectangle of a wrong object on the video image.

Figure 10:
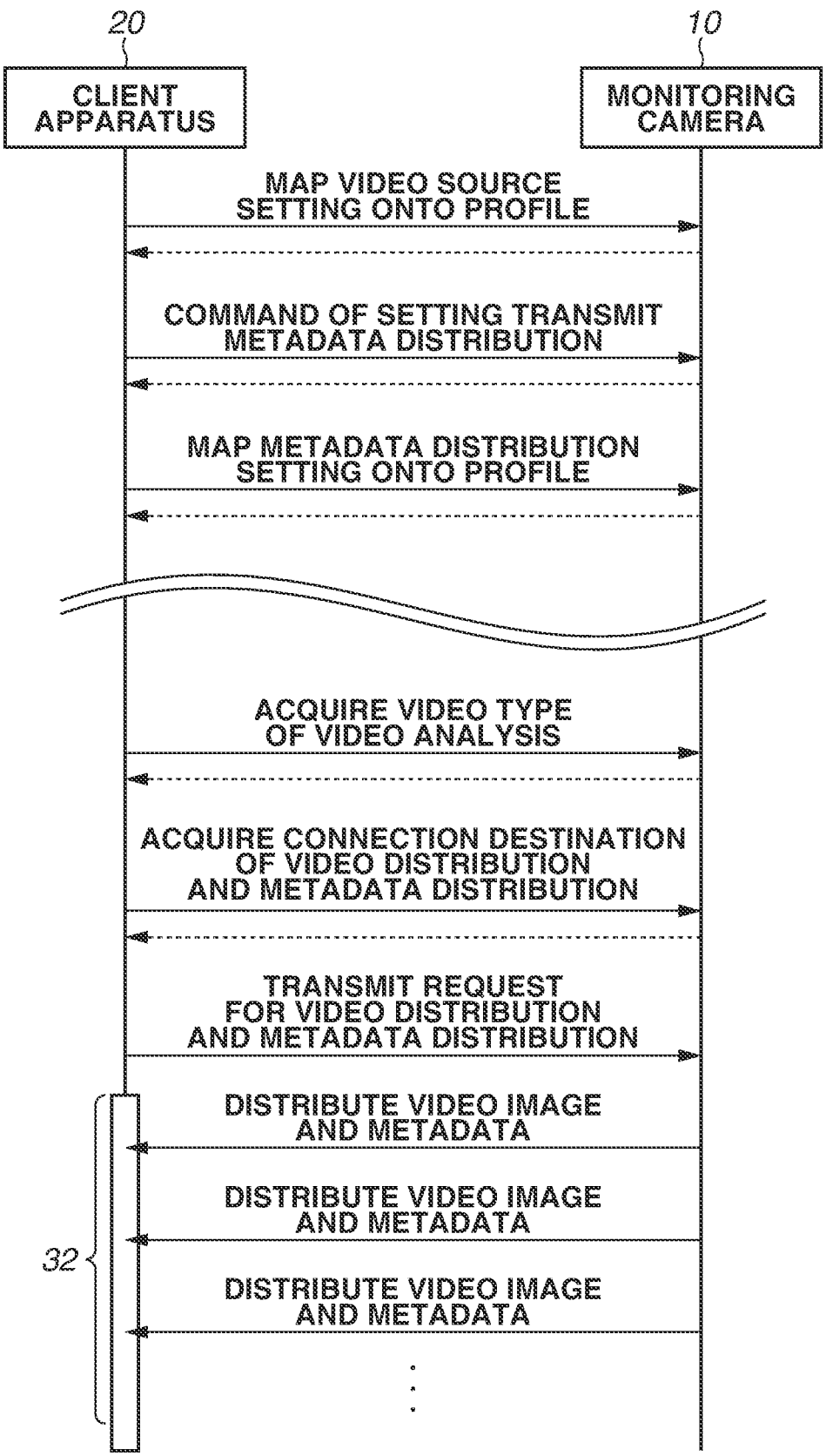
FIG. 10 is a sequence diagram illustrating an example of information processing in the system in the second exemplary embodiment.

The following describes processing 32 in which a circumscribed rectangle of object information is superimposed on a video image of the client apparatus 20 in a third exemplary embodiment, with reference to FIGS. 10 and 11. Description of the points that are similar to those in the first exemplary embodiment (FIGS. 2 to 4 and 6) is omitted.

The following describes a sequence in which the monitoring camera 10 distributes a video image and metadata to the client apparatus 20, with reference to FIG. 10.

The control unit 200 of the client apparatus 20 transmits, to the monitoring camera 10, a command for mapping the video source setting corresponding to the video type of the distribution target image, onto the profile setting in order to set the video type.

The control unit 100 of the monitoring camera 10 receives the command, maps the video source setting designated in the command onto the profile setting, and transmits a response indicating the completion of the profile setting as a response to the command to the client apparatus 20. The control unit 200 of the client apparatus 20 receives the response from the monitoring camera 10.

The control unit 200 of the client apparatus 20 transmits a metadata distribution setting command to the monitoring camera 10 in order to set whether to "include or not include" the object information in the metadata.

The control unit 100 of the monitoring camera 10 receives the command, updates the metadata setting with the designated setting, and transmits a response indicating the completion of the metadata distribution setting as a response to the command, to the client apparatus 20. The control unit 200 of the client apparatus 20 receives the response from the monitoring camera 10.

The control unit 200 of the client apparatus 20 transmits a command for mapping the designated metadata distribution setting onto the designated profile setting in order to distribute the metadata based on the metadata distribution setting.

The control unit 100 of the monitoring camera 10 receives the command, maps the designated metadata distribution setting onto the designated profile setting, and transmits a response indicating the completion of the profile setting as a response to the command, to the client apparatus 20. The control unit 200 of the client apparatus 20 receives the response from the monitoring camera 10.

The control unit 200 of the client apparatus 20 transmits a command for acquiring the video type for which the video analysis is performed to the monitoring camera 10 in order to acquire the video type for which the video analysis is performed. The control unit 100 of the monitoring camera 10 receives the command and transmits the video type to the client apparatus 20. The control unit 200 of the client apparatus 20 receives the video type from the monitoring camera 10.

The control unit 200 of the client apparatus 20 designates a profile and transmits a command for acquiring the connection destination of the video and metadata distribution to the monitoring camera 10 in order to acquire the connection destination of the video and metadata distribution on the set profile.

The control unit 100 of the monitoring camera 10 receives the command, generates the connection destination of the video and metadata distribution of the designated profile, and transmits the connection destination to the client apparatus 20. The control unit 200 of the client apparatus 20 receives the connection destination from the monitoring camera 10.

The control unit 200 of the client apparatus 20 transmits a command for requesting video and metadata distribution to the acquired connection destination.

The control unit 100 of the monitoring camera 10 receives the command, generates the video image to be distributed, generates metadata through the processing 31 in which object information is added to the metadata, and transmits the video image and the metadata to the client apparatus 20. The control unit 200 of the client apparatus 20 receives the video image and the metadata.

The control unit 200 of the client apparatus 20 performs the processing 32 of superimposing the circumscribed rectangle of the object information on the video image using the received video image and the received metadata.

FIG. 10 is not intended to limit the protocols of the commands, and the protocols of the commands are the ONVIF protocols, unique control protocols of the monitoring camera, etc.

The following describes the viewer screen in the present exemplary embodiment with reference to FIG. 7.

The control unit 200 of the client apparatus 20 transmits a command for acquiring the connection destination of the video and metadata distribution to the monitoring camera 10. Then, the control unit 200 of the client apparatus 20 receives the connection destination from the monitoring camera 10.

The control unit 200 of the client apparatus 20 transmits a command for requesting video and metadata distribution to the connection destination of the monitoring camera 10. Then, the control unit 200 of the client apparatus 20 receives the video image and the metadata from the connection destination of the monitoring camera 10.

The control unit 200 of the client apparatus 20 performs the processing 32 of superimposing the circumscribed rectangle of the object information on the video image to be distributed using the video image and the metadata received from the monitoring camera 10, and only if the video image to be distributed matches the video image on which the video analysis is performed, the circumscribed rectangle 52 of the object generated from the object information contained in the metadata is superimposed on the received video image, and the resulting image is displayed.

The control unit 200 of the client apparatus 20 superimposes the circumscribed rectangle 52 of the object generated from the object information contained in the metadata on the video image received from the monitoring camera 10 and displays the resulting image in the video image display area 51.

The following describes the processing 32 of superimposing the circumscribed rectangle of the object information on the distribution target video image of the client apparatus 20, with reference to FIG. 11.

In step S81, the control unit 200 of the client apparatus 20 receives the video image and the metadata from the monitoring camera 10.

In step S82, the control unit 200 of the client apparatus 20 acquires, from the memory 22, the video type for which the video analysis is currently performed, and determines whether the acquired video type matches the video type of the distribution target image that is requested by the client apparatus 20. The control unit 200 of the client apparatus 20 can discriminate the video type of the distribution target image that is requested by the client apparatus 20 based on the profile designated in the acquisition of the connection destination of the video and metadata distribution in FIG. 10. If the control unit 200 determines that the video type for which the video analysis is currently performed matches the video type of the distribution target image that is requested by the client apparatus 20 (YES in step S82), the processing proceeds to step S83. On the other hand, if the control unit 200 determines that the video types do not match (NO in step S82), the process in the flowchart in FIG. 11 is ended.

In step S83, the control unit 200 of the client apparatus 20 superimposes the circumscribed rectangle of the object information on the distribution target video image from the memory 12, and the process in the flowchart in FIG. 11 is ended.

As described above, in the third exemplary embodiment, the client apparatus 20 acquires the video type for which the video analysis is currently performed from the monitoring camera 10, and only if the distribution target video type matches the video type on which the video analysis is performed, the object information is added to the metadata. In this way, the client apparatus 20 is prevented from superimposing a circumscribed rectangle of a wrong object on the video type.

Other Embodiment

The present invention can also be realized through a process in which a program for realizing one or more functions in the above-described embodiments is supplied to a system or apparatus via a network or storage medium and one or more processors of a computer of the system or apparatus reads and executes the program. Further, the present invention can also be realized by a circuit (e.g., application-specific integrated circuit (ASIC)) configured to realize one or more functions.

While an example of the embodiments of the present invention is described above in detail, the present invention is not to be limited to a specific exemplary embodiment.

The above-described hardware configurations of the monitoring camera 10 and the client apparatus 20 are mere examples, and the monitoring camera 10 and the client apparatus 20 each can include, for example, a plurality of CPUs, a plurality of memories, a plurality of communication units, etc. Further, a plurality of CPUs can execute processing based on a program using data, etc. stored in a plurality of memories in each apparatus. Further, a graphics processing unit (GPU) can be used in place of the CPU.

Further, the above-described exemplary embodiments can be implemented in any combination.

Each of the above-described embodiments prevents the video type of a distribution target image and the video type of a video analysis, from not matching with each other and the client apparatus is prevented from superimposing wrong object information on a video image to be distributed.

Each of the above-described embodiments reduces the possibility that a distribution target video image and object information fail to match in the case in which the video image and the object information are associated with each other.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2018-011646, filed Jan. 26, 2018, which is hereby incorporated by reference herein in its entirety.

What is claimed is:

1. A video image transmission apparatus configured to transmit a first video image video image obtained by an image capturing unit, the video image transmission apparatus comprising a computer executing instructions that, when executed by the computer, cause the computer to function as:
    a determination unit configured to determine whether a video type of the first video image to be transmitted to an information processing apparatus matches a video type of a second video image on which video analysis is to the second video image being obtained by the image capturing unit;
    an addition unit configured to add object information, indicating an object detected by the video analysis on the second image, to metadata to be transmitted to the information processing apparatus, in accordance with a result of the determination by the determination unit; and
    a transmission unit configured to transmit the first video image and the metadata to the information processing apparatus,
    wherein the addition unit adds the object information to the metadata in a case where the determination unit determines that the video type of the first video image matches the video type of the second video image, and does not add the object information to the metadata in a case where the determination unit determines that the video type of the first video image does not match the video type of the second video image.

2. The video image transmission apparatus according to claim 1, wherein in a case where the image capturing unit is attached to a ceiling, the determination unit determines that the video type of the second video image on which the video analysis is performed is fish-eye, and in a case where the video type of the first video image to be transmitted to the information processing apparatus is fish-eye, the determination unit determines that the video type of the first video image matches the video type of the second video image.

3. The video image transmission apparatus according to claim 1, wherein in a case where the image capturing unit is attached to a wall, the determination unit determines that the video type of the second video image on which the video analysis is performed is panorama, and in a case where the video type of the first video image to be transmitted to the information processing apparatus is panorama, the determination unit determines that the video type of the first video image matches the video type of the second video image.

4. The video image transmission apparatus according to claim 1, wherein in a case where the video type of the second video image on which the video analysis is performed is fish-eye and the video type of the first video image to be transmitted to the information processing apparatus is fish-eye, the determination unit determines that the video type of the first video image matches the video type of the second video image.

5. The video image transmission apparatus according to claim 1, wherein in a case where the video type of the second video image on which the video analysis is performed is panorama and the video type of the first video image to be transmitted to the information processing apparatus is panorama, the determination unit determines that the video type of the first video image matches the video type of the second video image.

6. An information processing method to be executed by a video image transmission apparatus configured to transmit a first video image obtained by an image capturing unit, the method using a computer executing instructions that, when executed by the computer, cause the computer to execute the method, the method comprising:
   determining whether a video type of the first video image to be transmitted to an information processing apparatus matches a video type of a second video image on which video analysis is to be performed, the second video image being obtained by the image capturing unit;
   adding the object information, indicating an object detected by the video analysis on the second image, to metadata to be transmitted to the information processing apparatus, in accordance with a result of the determining; and
   transmitting the first video image and the metadata to the information processing apparatus,
   wherein the adding comprises adding the object information to the metadata, in a case where the video type of the first video image matches the video type of the second video image, and not adding the object information to the metadata, in a case where the video type of the first video image does not match the video type of the second video image.

7. A non-transitory, computer-readable recording medium storing a program that causes a computer to execute an information processing method of a video image transmission apparatus configured to transmit a first video image obtained by an image capturing unit, the method comprising:
   determining whether a video type of the first video image to be transmitted to an information processing apparatus matches a video type of a second video image on which video analysis is to be performed, the second video image being obtained by the image capturing unit;
   adding object information, indicating an object detected by the video analysis on the second image, to metadata to be transmitted to the information processing apparatus, in accordance with a result of the determining; and
   transmitting the first video image and the metadata to the information processing apparatus,
   wherein the adding comprises adding the object information to the metadata, in a case where the determination unit determines that the video type of the first video image matches the video type of the second video image, and not adding the object information to the metadata, in a case where the determination unit determines that the video type of the first video image does not match the video type of the second video image.

8. An information processing apparatus comprising a computer executing instructions that, when executed by the computer, cause the computer to function as:
   a reception unit configured to receive a first video image and metadata transmitted from a video image transmission apparatus, the first video image being obtained by an image capturing units;
   an acquisition unit configured to acquire information indicating a video type of a second video image on which a video analysis has been performed, the second video image being obtained by the image capturing unit;
   a determination unit configured to determine whether a video type of the first video image transmitted from the video image transmission apparatus matches a video type of the second video image on which the video analysis has been performed; and
   a display control unit configured to cause a display unit to display:
   the first video image on which a mark corresponding to object information contained in the metadata received by the reception unit is superimposed, in a case where the determination unit determines that the video type of the first video image matches the video type of the second video image, the object information indicating an object detected by the video analysis on the second video image; and
   the first video image on which the mark is not superimposed, in a case where the determination unit determines that the video type of the first video image does not match the video type of the second video image.

9. The information processing apparatus according to claim 8, wherein the mark is a circumscribed rectangle corresponding to the object information.

10. The information processing apparatus according to claim 8,
   wherein the video type of the first video image is either a panorama or a fish eye, and
   wherein the video type of the second video image is either a panorama or a fish eye.

11. An information processing method to be executed by an information processing apparatus, the method using a computer executing instructions that, when executed by the computer, cause the computer to execute the method, the method comprising:
   receiving a first video image and metadata transmitted from a video image transmission apparatus, the first video image being obtained by an image capturing unit;
   acquiring information indicating a video type of a second video image on which a video analysis has been performed, the second video image being obtained by the image capturing unit;
   determining whether a video type of the first video image transmitted from the video image transmission apparatus matches a video type of the second video image on which the video analysis has been performed; and
   displaying the first video image on which a mark corresponding to object information contained in the received metadata is superimposed in a case where the video type of the first video image matches the acquired video type of the second video image, the object information indicating an object detected by the video analysis on the second video image; and the first video image on which the mark is not superimposed, in a case where the video type of the first video image does not match the video type of the second video image.

12. A non-transitory, computer-readable recording medium storing a program that causes a computer to execute an information processing method of an information processing apparatus, the method comprising:

receiving a first video image and metadata transmitted from a video image transmission apparatus, the first video image being obtained by an image capturing unit;

acquiring information indicating a video type of a second video image on which a video analysis has been performed, the second video image being obtained by the image capturing unit;

determining whether a video type of the first video image transmitted from the video image transmission apparatus matches a video type of the second video image on which the video analysis has been performed; and displaying the first video image on which a mark corresponding to object information contained in the received metadata is superimposed in a case where the video type of the first video image matches the acquired video type of the second video image, the object information indicating an object detected by the video analysis on the second video image; and the first video image on which the mark is not superimposed, in a case where the video type of the first video image does not match the video type of the second video image.

* * * * *